Dec. 1, 1970     R. J. LAWRENCE     3,544,985
VOLTAGE-INDICATING DEVICE FOR A SWITCH BUSHING STUD
Filed Dec. 22, 1966     3 Sheets-Sheet 1

Dec. 1, 1970       R. J. LAWRENCE       3,544,985
VOLTAGE-INDICATING DEVICE FOR A SWITCH BUSHING STUD
Filed Dec. 22, 1966       3 Sheets-Sheet 2
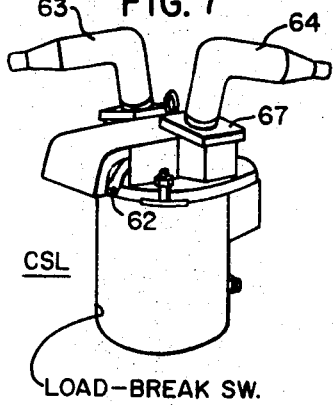
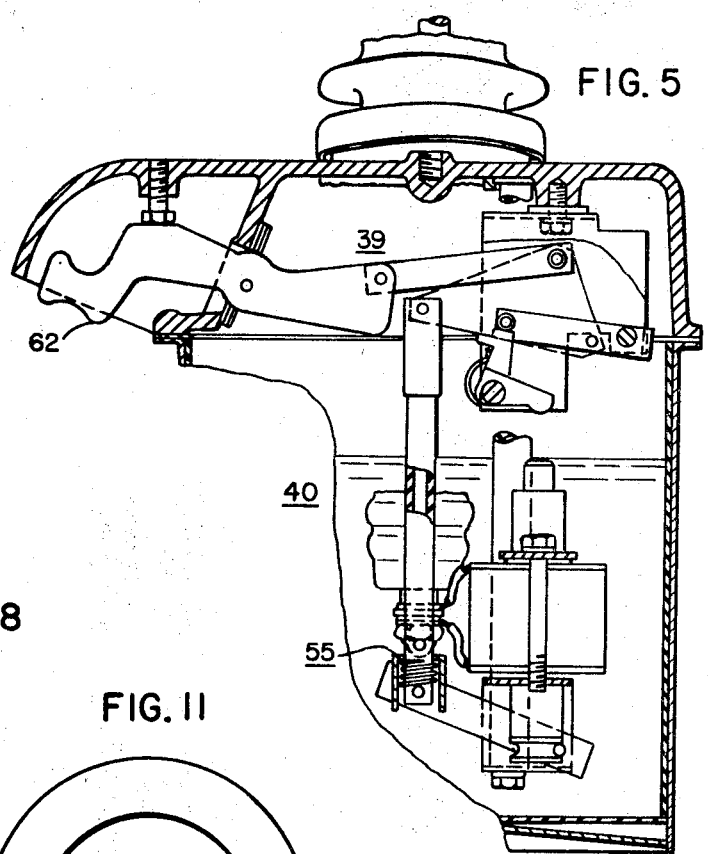
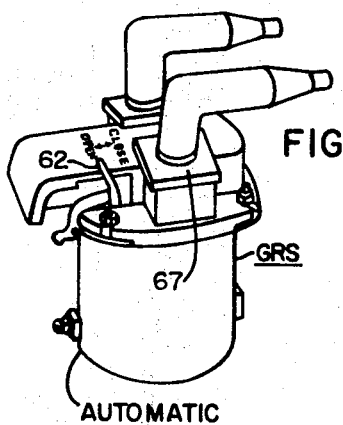
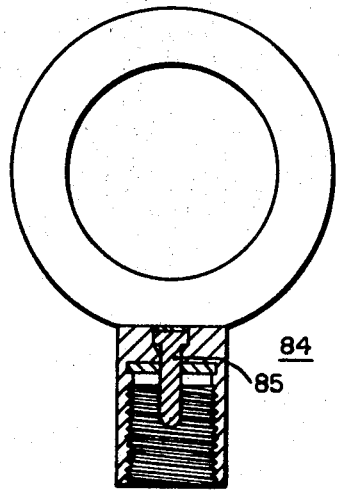
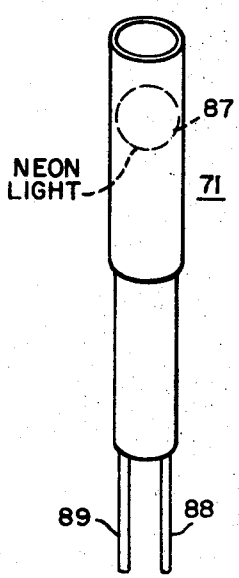
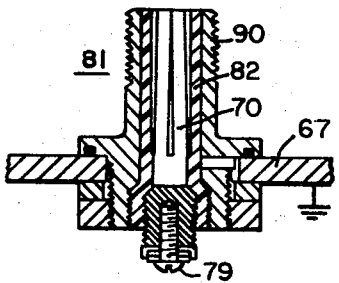
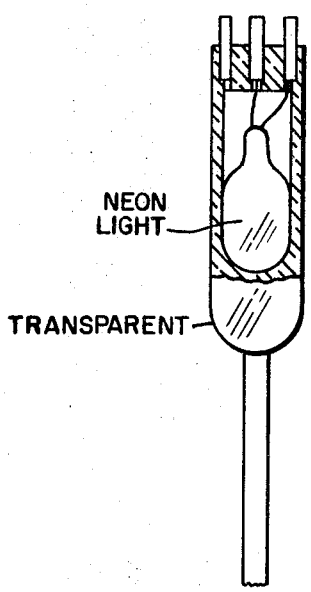

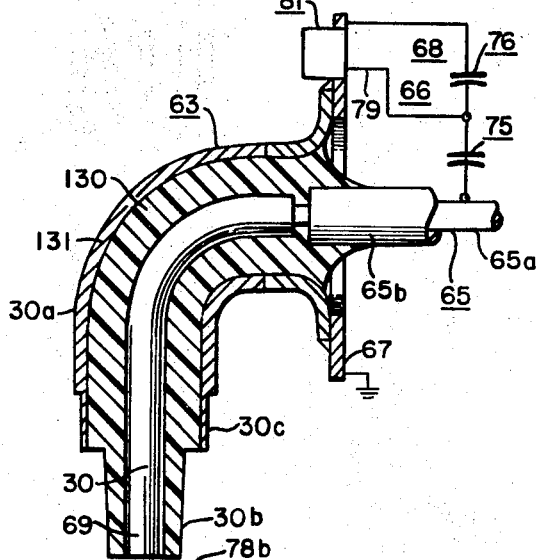
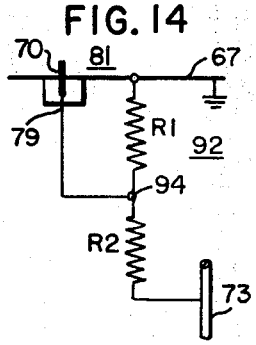
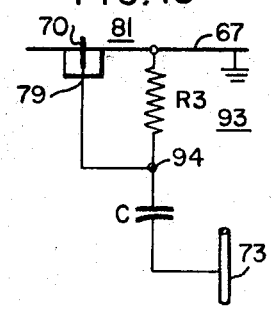
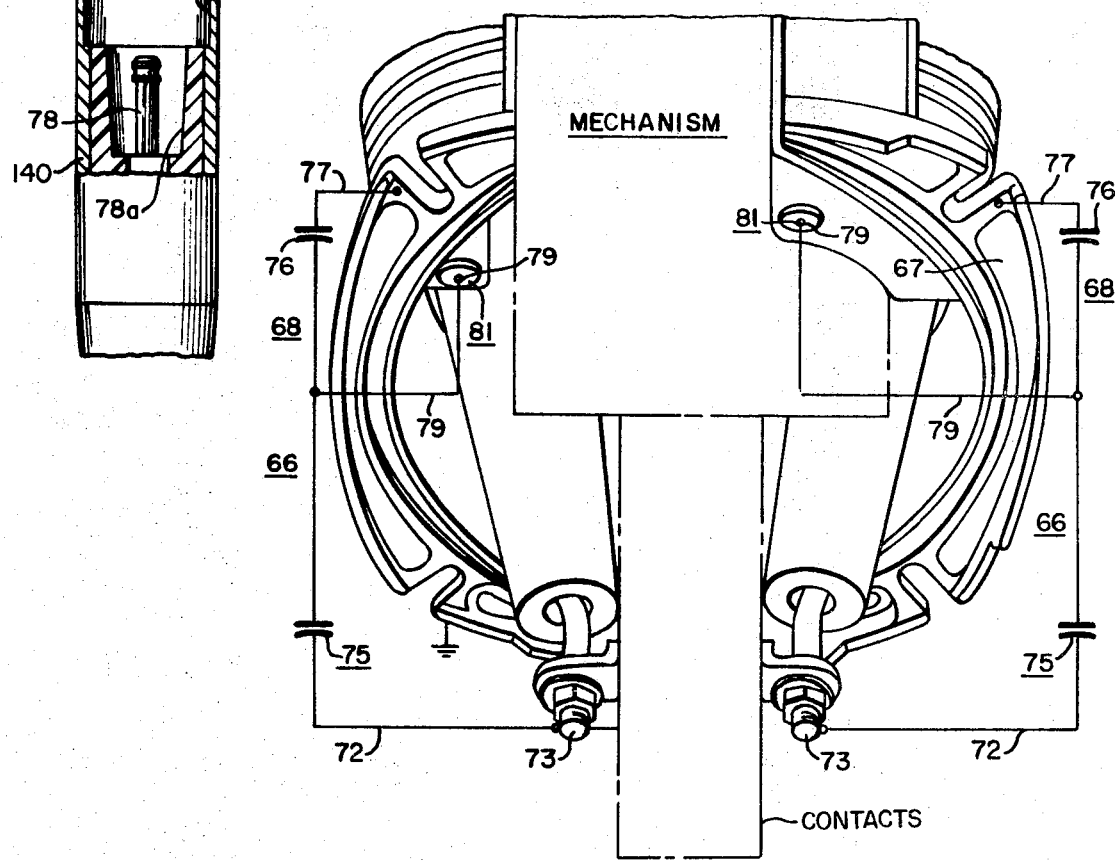

United States Patent Office 3,544,985
Patented Dec. 1, 1970

3,544,985
VOLTAGE-INDICATING DEVICE FOR A SWITCH BUSHING STUD
Robert J. Lawrence, Bloomington, Ind., assignor to Westinghouse Electric Corporation, Pittsburgh, Pa., a corporation of Pennnsylvania
Filed Dec. 22, 1966, Ser. No. 603,999
Int. Cl. G08b 21/00
U.S. Cl. 340—248　　　　　　　　　　　　　　　　10 Claims

ABSTRACT OF THE DISCLOSURE

A voltage-indicating test socket is provided on the grounded casing of a tank-type switch for determining the energized state of the terminal-bushing studs leading into the apparatus. A connection from a voltage divider, disposed physically within the tank structure, connected between the terminal bushing stud and the grounded cover is provided; and a neon lamp, for example, indicating device may be applied to the test terminal on the grounded cover, at desired times, to indicate the voltage condition of the respective terminal-bushing stud. Preferably, a shorting cap is used with the insulated test socket to remove voltage from one branch of the voltage divider for long life.

The voltage-dividing means may be, for example, two capacitors in series, or two resistors in series, or a resistance and a capacitance in series, all such elements being preferably physically disposed within the tank structure.

---

This invention relates, generally, to circuit interrupters, or switches of the reclosing or non-reclosing type utilizing terminal-bushing or other connecting apparatus, and, more particularly, to a voltage-indicator device for predetermining the energized state of terminal-bushing studs or connecting studs of such apparatus.

As well known by those skilled in the art, occasionally, in the operation of an underground distribution system, for example, it is necessary to disconnect a connected cable from a piece of electrical apparatus. This happens, for instance, if work is to be done on a section of connected cable, new equipment loads are to be added, etc. There is a considerable hazard present in disconnecting the connected table, if it is an energized or "live" state. If the cable is, in fact, energized, the workman or lineman, in disconnecting the energized cable, may cause a fault to occur, consequently drawing a long high-voltage arc, which may not only injure the lineman himself, if he is very close, but also such a fault, with its concomitant arcing at high voltage, may damage the associated apparatus.

Normally, a cable is deenergized before it is disconnected. As a safety meaure, in order to ensure that the cable has, in fact, been deenergized, it is desirable to have a voltage test point to accurately check to see if the voltage is off, and that the cable, to be disconnected, is deenergized. The provision of such a test point for voltage indication of the terminal-bushing stud or connector stud is, therefore, very desirable. Accordingly, it is a general object of the present invention to provide a voltage-indicator device for circuit interrupters of the reclosing, or non-reclosing type including also manually operable switches, so that the lineman may accurately predetermine, with all reliability, that a terminal-bushing stud and the connected cable is either deenergized, or "dead," or, if in fact it is energized, that the circuit must be disconnected and deenergized at another series circuit-controlling switch.

Still a further object of the present invention is the provision of an improved sectionalizing switch having a voltage tap point at the grounded cover of such device so that, with facility and complete assurance, one may predetermine, with a neon-light indicator, for example, that the respective terminal-bushing stud is energized, or is in a deenergized state.

Still a further object of the present invention is the provision of a manually operable switch, or circuit interupter, which will have a convenient voltage-indicating point for each of the two terminal-bushing studs associated with such a switch, so that the lineman may accurately predetermine, with all reliability, the energized condition of the terminal-bushing stud and connected cable.

Still a further object of the present invention is the provision of a convenient voltage indicator for underground switches of the submersible type, that is, reclosers and sectionalizing switches adapted for underground vault application, in which, with facility, the workman may predetermine, from above the vault at ground level, which of the two terminal-bushing studs is, in fact, energized or deenergized, so that he will know whether or not the respective cable, connected to the terminal-bushing stud, is "dead," or energized, and the circuit must be disconnected at some other point.

Yet a further object of the present invention is the provision of an improved voltage-indicating tap connection for each of the two terminal-bushing studs of a circuit interrupter.

An ancillary object of the invention is to provide a voltage indicator disposed at a convenient point on the cover of a switch to predetermine the voltage condition of a terminal-bushing stud or a lead connector.

In accordance with a preferred embodiment of the invention, there is provided a voltage divider connected between the terminal-bushing stud and the grounded cover of the enclosed switch. A high-voltage ceramic capacitor is in series with a higher-capacitance capacitor, and the voltage across the low arm of the divider is brought out to a coaxial cable connector on the top grounded cover of the switch. A neon lamp, for example, which starts to glow at about 50 volts, is applied to the test terminal on the grounded cover to indicate the voltage condition of the respective terminal-bushing stud. Desirably, the capacitance tap indicator has a shorting cap, so that when the cap is screwed down tightly, or pushed into position, the low arm of the voltage divider will be shorted out to reduce voltage stress upon the low arm of the divider to test times only, and, therefore, enhance its reliability.

As an alternative voltage divider arrangement, two resistors could be provided in series, or a resistance could be provided in series with a capacitance.

The neon-light indicator may either be a relatively small hand-operable device, or it may be disposed at the end of a hot stick for remote operation by the lineman.

Further objects and advantages will readily become apparent upon reading the following specification, taken in conjunction with the drawings, in which:

FIG. 1 is a diagrammatic view of a typical distribution circuit indicating a fault condition, and the necessity for the lineman to predetermine whether the cable to be disconnected from the switch is energized, or deenergized before the actual disconnection process;

FIG. 2 diagrammatically illustrates a further application of the invention in which it is desired to add additional transmission equipment to a cable section and, therefore, it is again necessary to know whether or not the cable ends and consequently the terminal-bushing studs are energized, or deenergized before the cable disconnection process;

3

FIG. 3 diagrammatically illustrates the use of sectionalizing switches to control radial distribution circuits, in combination with a series-connected recloser, so that should one wish to disconnect the cable connection to the sectionalizer, he must know whether the cable connection thereto is energized, or deenergized;

FIG. 5 is a vertical sectional view taken through a conventional sectionalizing switch to illustrate the mechanism and integrator therefor;

FIG. 6 is an enlarged perspective view of the two terminal bushings extending within the enclosing tank structure supporting the stationary contacts of a conventional sectionalizer switch illustrating an embodiment of the invention;

FIG. 7 is an elevational perspective view of a load-break switch of the submersible type to which the present invention may be applied;

FIG. 8 is an elevational perspective view of a sectionalizing switch of the submersible type to which the present invention may be applied;

FIG. 9 is a vertical sectional view taken through a submersible-type of terminal, or connector of a switch or sectionalizer, indicating an application of the invention;

FIG. 10 is an enlarged vertical sectional view taken through the coaxial cable connector located on the grounded metallic cover of the switch;

FIG. 11 is an enlarged view of the shorting cap applicable to the coaxial cable connector of FIG. 10;

FIG. 12 is an elevational view of a relatively small manually-operable neon-lamp indicator to be used by the lineman in connection with the coaxial cable connector of FIG. 10;

FIG. 13 illustrates, in perspective, a variant-type of neon-lamp indicator adaptable for hot-stick remote application; and FIGS. 14 and 15 diagrammatically indicate alternate-types of voltage-divider arrangements.

As well known by those skilled in the art, occasionally, in the operation of an underground electrical distribution system, it is necessary to disconnect a connected cable from a piece of switch apparatus. This happens, for instance, if work is to be done on a section of connected cable, new loads are to be added, or for other reasons. There is a considerable hazard of electrical shock in disconnecting the connected cable, if, in fact, it is energized, or "hot." An arcing fault may occur, damaging the apparatus and burning and injuring the lineman, if he is very close. Normally, a connected cable is always deenergized before it is disconnected. As a safety measure, in order to ensure that the connected cable has been deenergized, it is desirable to have a voltage test point to check with complete assurance that the voltage is off.

Figure 1:
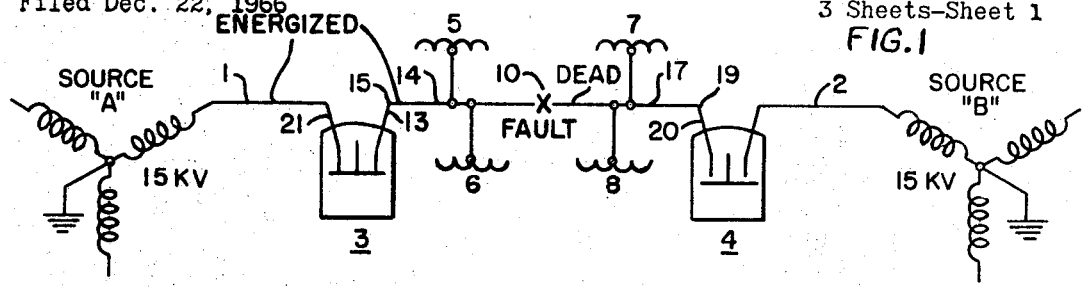

With reference to FIG. 1, it will be noted that there are provided two sources of power A and B feeding through cable connections 1, 2 a pair of serially-related switches 3, 4. These switches 3, 4 may either be of the reclosing or non-reclosing type, or, for certain applications, may be merely manually operated. Between the two reclosers 3, 4, there are provided distribution transformers 5–8 feeding load circuits, not shown. Assuming, for instance, that a fault occurs at the point 10, it is desirable for a lineman to repair the fault condition to reestablish service. It will be obvious that if the circuit interrupter 3 is closed, even though its indicating flag indicates that it is "open," the terminal stud 13 will be energized, and upon disconnecting the cable 14 at the point 15, the lineman may be injured and seriously burned.

FIG. 1 illustrates the condition where, in fact, the switch 3 is closed, whereas the other switch 4 is open, and, consequently, the cable section 17 is deenergized, or "dead," and it is safe to disconnect the cable connection 17 at the point 19 from the terminal stud 20. As a result, it is essential for the workman to know, first, which terminal stud (in FIG. 1, terminal stud 21) is connected to the source A, and, secondly, whether the other terminal stud (13 in FIG. 1) is, in fact, dead.

Figure 4:
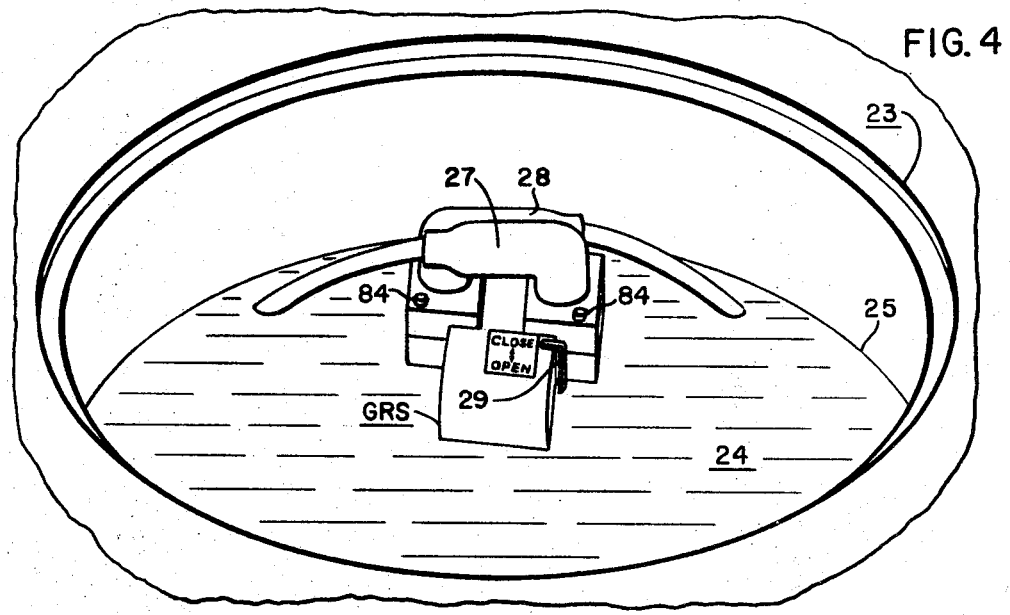
FIG. 4 is a perspective view indicating an underground vault of the submersible type for an underground distribution system indicating the water level in relation to the submerged sectionalizing switch, and how, physically, it is impossible for a lineman to determine which of the two cables is the energizing cable.

FIG. 4 illustrates a physical condition which confronts a lineman in the servicing of underground submersible equipment. It will be noted that there is a vault 23, which may contain water 24 up to the level 25, and the cable connections 27, 28 are illustrated, as being of the submersible type, as described later in connection with FIG. 9. It will be noted that an indicator 29 indicates that the switch is either in the "closed" condition, or in the "open" condition. However, the lineman does not know from his view above the vault 23 which cable 27, 28 is connected to the generating source, and which cable is connected to the controlled feeder circuit. It is obvious that he must know whether, in fact, the cable is deenergized before he is able to pull free from the associated connector 30, such as the type illustrated in FIG. 9 of the drawings.

Figure 2:
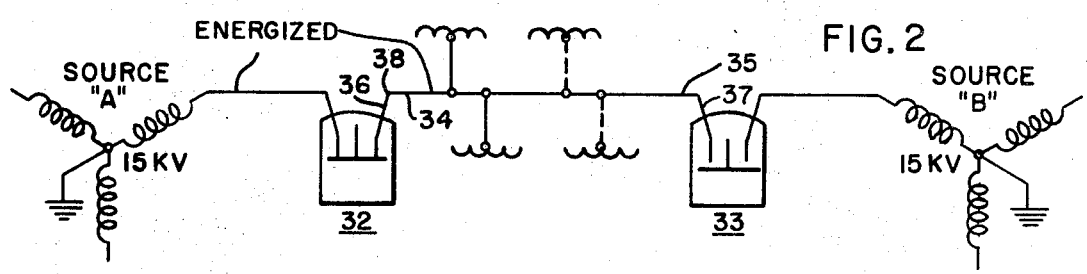

FIG. 2 illustrates a typical situation involving the addition of new electrical distribution equipment to be added between the two switches 32, 33, and in which, again, it is desirable to be able to disconnect the cable sections 34, 35 from the terminal equipment 36, 37 with safety. FIG. 2 illustrates the condition, similar to FIG. 1, in which the switch 32 is closed, whereas the other series switch 33 is open, and, consequently, the hazard of electrical shock exists, which accompanies the disconnection of the cable section 34 from the terminal stud 36 of switch 32. It will be obvious that if the switch 32, in fact, is closed, even though its indicator indicates that it is "open," an arc will be drawn upon disconnection of the cable connection 34 at the point 38.

Figure 3:
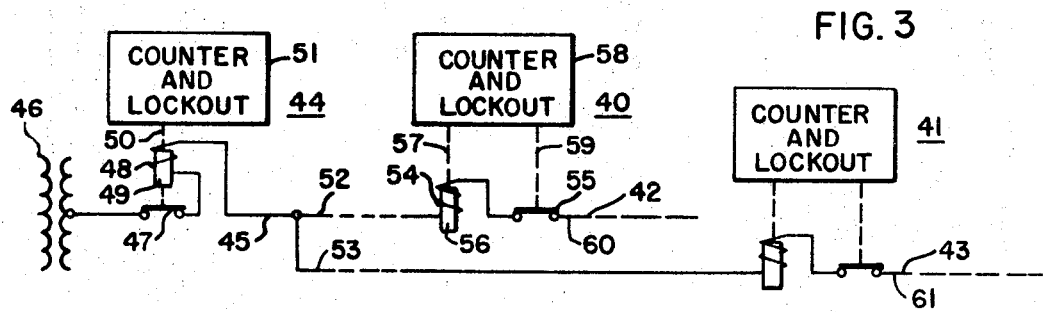

FIG. 3 illustrates the situation involving a number of sectionalizers 40, 41 connecting radial distribution circuits 42, 43 and controlled by a recloser 44. As well known by those skilled in the art, sectionalizers 40, 41 such as the type "GRS" manufactured by the Westinghouse Electric Corporation, may be applied to very good advantage in conjunction with reclosers 44 and reclosing-oil circuit breakers. When used with reclosers 44, they provide a sectionalizing point at lower cost with the same quality of protection as a recloser. When used with reclosing oil circuit breakers, they will replace heavily-loaded fuse cutouts, and provide safe load-break rating and more positive coordination than fuses.

In FIG. 3, I show my invention applied to a rural power-line 45 of the type described, which is fed from a power-source 46 through a diagrammatically-indicated recloser 44, having a normally closed breaker-contact 47, and an operating coil 48, both connected in series with the line 45. The recloser 44 has an armature 49 which is mechanically connected, at 50, to a block 51, which represents any suitable counter-and-lockout mechanism, which counts the number of rapidly repeated contact-opening-and-reclosing operations, and after a predetermined number of such operations locks out the recloser 44 by thereafter holding the contact 47 in its open position, until the recloser 44 is manually reset. It will be understood that the recloser-contact 47 is normally closed, but opens in response to a predetermined overcurrent-condition in the coil 48. The opening of the contact 47 deenergizes the coil 48, and when the coil 48 is deenergized, the recloser-contact 47 automatically recloses itself, until the counter-mechanism 51 becomes effectively operative, and holds the contact 47 in its open position. There are a number of such reclosers 44 on the market, and their specific construction constitutes no part of my present invention.

The rural power-line 45 may extend out, either in a single branch, or in a plurality of branches 52 and 53, each branch usually supplying a number of customers located at various points distributed along the line. Most of the faults which will occur on such a line are faults, which will clear themselves as soon as voltage is removed from the line, although sometimes a fault may require a certain length of time, or a certain number of succcessive openings and reclosures of the recloser 44, in order to burn off or clear the fault. The recloser 44 protects such a line by more or less rapidly opening and reclosing its breaker-contact 47 for a predetermined number of times, such as 4 or 5 times, after which, if the fault has not then cleared itself, the fault is considered to be a permanent fault, and the recloser permanently opens its contact 47.

Since a line 45 of the type in question, or its several branch-lines 52 and 53, usually serve a considerable number of customers, it has been recognized as being desirable to use one or more sectionalizers 40, 41 for increasing the number of points, along the line, at which the circuit can be disconnected in the event of a permanent fault which will not clear itself, thus limiting the number of customers, or the amount of the circuit, affected by any permanent fault.

FIG. 3 illustrates a typical situation in which a sectionalizer 40 is inserted at some intermediate point along the length of the branch-line 52, while a similar sectionalizer 41 is inserted at some intermediate point along the branch-line 53. Each sectionalizer, such as 40, comprises a series-connected operating-coil 54, and a normally-closed, series sectionalizer-contact 55, both of which are connected in series with the associated branch-line, such as 52. The current-coil 54 operates on an armature 56 which is mechanically connected, as diagrammatically indicated at 57, with a counter-and-lockout mechanism 58, which is indicated by block-diagram in FIG. 3. The counter-and-lockout mechanism 58 is connected, as diagrammatically indicated at 59, so as to trip out the sectionalizer-contact 55 after a predetermined number of "counts" of fault-current surges followed by interruption of the current through the coil or solenoid 54, the mechanism thereupon not only opening the contact 55 but also locking it out, or holding it open, so as to disconnect the power-service from the rest of the line extending beyond the location of the sectionalizer (such as 40), until the fault can be located and corrected, after which the sectionalizer 40 will be reclosed or rest by hand.

It will be apparent that should there occur a fault condition on the cable connections 42 or 43, it is desirable to disconnect the respective sectionalizer 40, 41 and to make sure that the cable connection 42, 43 is, in fact, "dead." It is desirable to have a voltage indication of the energized state of the terminal stud. Or, should additional equipment be desired to be added to the cable sections 42, 43, again it is desirable to know whether, in fact, the cable sections 42 or 43 and the respective terminal stud 60, 61 is, in fact, "dead" for eliminating any hazard of electrical shock to the lineman.

FIG. 5 illustrates a vertical sectional view taken through the mechanism of the sectionalizers 40, 41, illustrated in FIG. 3. The particular mechanical operation of the sectionalizer forms no part of the present invention, and reference may be had to U.S. Pat. 2,697,149, issued Dec. 14, 1954 to Wallace et al., and assigned to the assignee of the instant application. It will be noted that there is provided an external flag, or indicator 62, which, when rotated counterclockwise and becomes visible, indicates, supposedly, that the switch 40 has been closed.

FIGS. 7 and 8 illustrate, respectively, submersible types of distribution switching equipment, FIG. 7 illustrating a load-break manually-operable switch of the type designated "CSL," and so referenced, manufactured by the foregoing company, and having submersible-type cable connectors 63, 64. The internal linkage may be as taught by U.S. Pats. 3,206,575 or 2,871,415 for manual operation of the contact structure.

From the foregoing, it is obvious that when a lineman looks down into a vault 23, such as the type set forth in FIG. 4, observing equipment of the type illustrated in FIGS. 7 and 8, it is necessary for him, in avoiding electrical shock, to be sure that if the indicator lever, or "flag" 62 indicates the interrupter to be in the open-circuit position, with the contacts separated, that, in fact, the bushing stud is deenergized, or "dead," so that with a perfect feeling of confidence and security he may grasp the elbow-type connectors 63, 64, and remove them from the associated bushing stud or lead with a complete feeling of security. Failure of the mechanism linkage 39 (FIG. 5), so that "open" indication of the flag 62 might still lead to a closed condition of the contacts 55, must be guarded against, and insurance must be provided against this hazard.

FIG. 9 illustrates a possible type of submersible-type of cable connector suitable for use in connection with the switches illustrated in FIGS. 7 and 8, and adaptable for a submersible-type of installation 23, such as illustrated in FIG. 4 of the drawings. It will be noted that a connector 63 has been assembled at the end of the shielded cable in order to enable the cable to be attached to a lead 65 (which has an electrical conductor 65a with an insulating cover 65b, a complementary connector having been formed integrally with the cover 67 of the switch housing. The complementary connector has been formed with an electrical contact 69 fixed to the conductor, and having a socket for receiving the complementary plug 78 of the assembled connector. A housing 30a has external male surface portions 30b, 30c for receiving complementary female surfaces 78a, 78b to form a water-tight seal and electrical connections. An inner sleeve 130 of resilient insulating material surrounds the contact and serves to electrically isolate the contact from the outer sleeve 131 of electrically conductive resilient material, which is electrically connected to the switch housing. Thus, when the housing 30a is assembled with housing 140 the shielded cable is detachably connected to the switch lead 65a with the shield electrically connected to the switch housing in a simple and effective manner. Further details of this construction are set forth in U.S. Pat. 3,243,756, issued Mar. 29, 1966 to R. C. Ruete et al.

In other words, with reference to FIG. 9, and as described in United States Ruete et al. Pat. 3,243,756, issued Mar. 29, 1966, the removable cable connector 63 may be removed without drawing an arc, which would be the case if the terminal stud or lead 30 were, in fact, energized although the indicator 62 (FIG. 7) indicated the switch 40, CSL to be open. Also, in viewing an installation 23 of the type of FIG. 4, the workman does not know which of the terminal studs 27, 28 (FIG. 4) is connected to the generating equipment, so that even though the contacts of the GRS switch were open, nevertheless the one terminal stud 27 or 28 would be constantly connected to the energizing source. Note FIGS. 1 and 2 in this connection.

From the foregoing considerations, it will be apparent that for safety reasons it is extremely desirable for a lineman to have a convenient means of determining whether or not, in fact, a bushing stud, or a stud of a connector 27, 28 secured to the cover of a switch GRS (FIG. 4) is energized, or whether it is deenergized, and hence safe to be uncoupled.

Broadly, the present invention is concerned with the concept of providing a voltage-dividing means 66 (FIG. 9) between the live conductor stud or lead connection 30 (FIG. 9) and the grounded casing cover 67, and tapping off a small increment 68 (FIG. 9) of this voltage to be applied to a test terminal 70 (FIG. 10) conveniently located at the upper cover 67 of the device, with manually-applicable means 71 (FIG. 12) for conveniently determining whether the bushing stud lead 30 is energized. One means of accomplishing these ends is indicated in FIGS. 6 and 9, where it will be observed that a connection 72 to the live conductor stud 73 is connected to two capacitor units 75, 76 in series, the divider 66 being connected by another connection 77 to the grounded casing cover 67. A tap 79 is brought out from the low arm 68 of the voltage divider 66 to a coaxial-type cable connector 81 situated at the top of the switch, conveniently on the cover 67. FIG. 10 shows the tap connection 79 in more detail. It will be noted that a sleeve of insulation 82 is provided surrounding the tap connection 70, so that this point is insulated from ground potential and from the grounded metallic cover 67 of the switch.

For the purpose of preventing direct moisture, and for additionally shorting the low arm 68 of the voltage divider 66 to reduce the voltage stress upon the higher-capacitance element 76, a shorting cap 84 is provided, as shown more clearly in FIG. 11 of the drawings. With reference to FIGS. 10 and 11, it will be observed that the grounding prong 85 is adaptable for insertion into the test tap 70 to thereby ground the test tap 70, and thereby short out to ground the low arm 68 of the voltage divider 66. A neon lamp 87 is provided, as illustrated in FIGS. 12 and 13, so that by the insertion of the two prongs abutting the outer threaded portion 90 of the coaxial cable connector 81, one can apply the voltage across the low arm 68 of the voltage divider 66 to the neon lamp 87, and if this lights, it is obvious that the respective bushing stud 77 is energized, or a line potential.

From the foregoing, it will be apparent that the test point consists of a voltage divider 66 used with a Neon lamp 87. The divider 66 comprises a high-voltage ceramic capacitor 75, for example, in series with a higher-capacitance capacitor 76 between line and ground. The voltage 68 across the low arm of the voltage divider 66 is brought to a test point 70 of the coaxial cable connector 81, on the top grounded cover 67 of the switch. The Neon lamp 87, for example, may be a GE NE–51 lamp, which starts to glow at about 50 volts R.M.S. The high-voltage, for example, 165 picofared ceramic capacitor 75 in series with the 1600 volt, .0033 microfared capacitor 76 gives a voltage-divider ratio of about 20:1. Thus, the tap or test voltage is 750 volts with 15 kv. applied to the switch, 400 volts with 8 kv. applied to the switch, and 50 volts with 1 kv. applied to the switch. The lamp socket has an 18,000 ohm limiting resistor.

The cap 84 on the connector or test point 81 on the outside of the switch is equipped with a shorting pin 85, which short circuits the low-arm capacitor 76 except during the time of actual test. This minimizes the possibility of any failure of this capacitor 76, which would result in a false indication of no voltage on the cable.

In using the voltage indicator 66, the preferred procedure is to put the Neon light 71 in place before the circuit is opened (by operation of the particular switch), and then to observe the Neon light 87 as the switch is opened. The Neon light should go out at the same instant that the switch is opened, giving a good check that the circuit has been deenergized. From the foregoing, it will be observed that this voltage indicator 66 operates to a lower voltage on the cable, which is desirable.

In AIEE Paper No. 56–111 "Let-Go Currents and Voltages" by Dalziel and Massoglia, it has been determined that maximum safe currents through the human body of 6 milliamperes for women and 9 milliamperes for men. The high-arm capacitor 75 of 165 picofarads has a 60 cycle impedance of approximately 16 megohms. At 16 kv. applied to the switch (this is above the rating of the switch), there is one milliampere available. This is substantially within the safe level. In addition, the coaxial connector 81 used, with the test tap 70 shielded, makes it difficult to get across the test terminal 70 accidentally, and the removable cap 84 on this terminal 70 makes it completely grounded as long as the cap 84 is in place.

From the foregoing, it will be noted that the voltage divider 66 provides indication of voltages in excess of 1 kv. on the cable stud 73. It is convenient and safe to use. The normal use would be to put the voltage-indicating Neon light 71 on the test terminal 81, while it is still energized, and then open the circuit, observing the Neon light 87 to go out.

From the foregoing, it will be apparent that in an installation 23, for example, of the type illustrated in FIG. 4, the lineman would remove the shorting cap 84 and while the indicator flag 29 was in the closed position, apply the prongs 88, 89 of the Neon lamp to the test terminal 70 and to the outer threaded sleeve portion 90 (FIG. 10). The Neon lamp 87 would light, and then the lineman would operate the switch GRS so that the indicator flag 29 would be moved to the open position. If the Neon light 87 goes out, it is obvious that the respective bushing stud 73 is "dead," and that it is safe to remove the cable connector 27, 28 (FIG. 4).

From the foregoing, it is apparent that there has been provided a convenient and easily-operable voltage-indicating device 66 for insuring safety concerning the activities of linemen, when they are working on different types of distribution systems. By utilizing the device 66, assurance is obtained that the cable 27, 28 is, in fact, "dead" or deenergized, and that it is then safe to remove the cable connection 27, 28 from the switch GRS and perform the necessary work on the cable section 34, 35 (FIG. 2), namely either adding additional equipment or repairing a fault situation, as desired.

FIGS. 14 and 15 diagrammatically illustrate variant types of voltage-divider arrangements 92, 93, which may be substituted for the two series capacitor arrangement 66 of FIG. 6. Since it is desirable to have the tap point 94 at relatively low voltage, the impedance of $R_1$ of FIG. 14 or $R_3$ of FIG. 15 is relatively lower than the impedance of $R_2$ of FIG. 14 or C of FIG. 15, for the reasons pointed out above.

I claim as my invention:

1. In combination, an enclosed switch having a pair of separable contacts disposed within a grounded tank structure, a pair of line-terminal connectors extending interiorly of said grounded tank structure for connection to said pair of separable contacts, voltage-indicating means for positively predetermining whether the terminal leads are energized or deenergized prior to manual disconnection of the associated cables or lines comprising voltage-divider means electrically connected between each terminal lead and ground, said voltage-divider means comprising series impedance elements physically mounted interiorly of said grounded tank structure, a test point connected to a part of each voltage-divider means and brought to an insulated part of said grounded tank structure, indicating means, and detachable connecting means coupled to said indicating means applied externally of said casing structure to each of said test points for positively predetermining the voltage condition of the respective terminal leads prior to manual disconnection thereof, whereby a lineman will not be injured in making a manual disconnection of either of the "live" terminal leads.

2. The combination of claim 1, wherein said indicating means comprises a Neon lamp.

3. The combination of claim 2, wherein the Neon lamp has a pair of spaced testing prongs and each test point is connected to a coaxial-type cable connector.

4. The combination of claim 1, wherein said voltage divider means comprises an impedance having an intermediate tapping portion.

5. The combination of claim 4, wherein said impedance comprises a pair of series-capacitors of unequal capacitance value.

6. The combination of claim 3, wherein a shorting cap is provided for each test point.

7. An enclosed tank-type switch for distribution circuits having a grounded metallic cover with a pair of cable-connecting bushings extending through said grounded metallic cover, a cooperating grounded tank, two coaxial cable connectors mounted upon said grounded metallic cover with insulated test sockets and removable caps, voltage-dividing means disposed interiorly within the tank electrically connected between each of the terminal leads of the two bushings and ground, said voltage-divider means comprising series impedance elements physically mounted within said tank structure, a tap connection on each of said voltage-dividing means connected to each of said insulating test sockets, separable contacts disposed within the tank and connected to the two terminal leads, and voltage-indicating means applied by a lineman to each of said test sockets exterminally of said tank so as to positively predetermine the voltage condition of each of said terminal leads prior to a manual disconnection of the respective cable.

8. The combination of claim 7, wherein said voltage-indicating means is a manually-operable Neon lamp applied to each coaxial cable connector.

9. The combination according to claim 1, wherein the voltage-divider means comprises two resistors in series arrangement with each test point connected between said two resistances.

10. The combination according to claim 1, wherein the voltage-divider means comprises a resistance and a capacitance in electrical series, and each test point is connected between the resistance and capacitance elements.

References Cited

UNITED STATES PATENTS

| | | | |
|---|---|---|---|
| 1,695,864 | 12/1928 | Sessing-Haus | 324—127 |
| 2,199,757 | 5/1940 | Rohde | 324—54 |
| 2,632,794 | 3/1953 | Alexander | 324—127 |
| 3,037,161 | 5/1962 | Cummings | 324—52 |
| 3,068,409 | 12/1962 | Bigliano et al. | 324—51 |
| 3,125,720 | 3/1964 | Swift | 324—72 |
| 3,301,983 | 1/1967 | Collins et al. | 200—144 |
| 3,390,331 | 6/1968 | Brown et al. | 340—252 |
| 3,393,285 | 7/1968 | Harper | 200—144 |
| 2,363,396 | 11/1944 | Carlson | 340—248 |
| 3,343,153 | 9/1967 | Waehner | 340—252 |

DONALD J. YUSKO, Primary Examiner

D. MYER, Assistant Examiner

U.S. Cl. X.R.

200—167; 324—133; 340—252